March 18, 1952  N. A. AGAPETUS ET AL  2,589,212
PURIFICATION OF CRUDE ETHYLENE DICHLORIDE
Filed Nov. 8, 1949
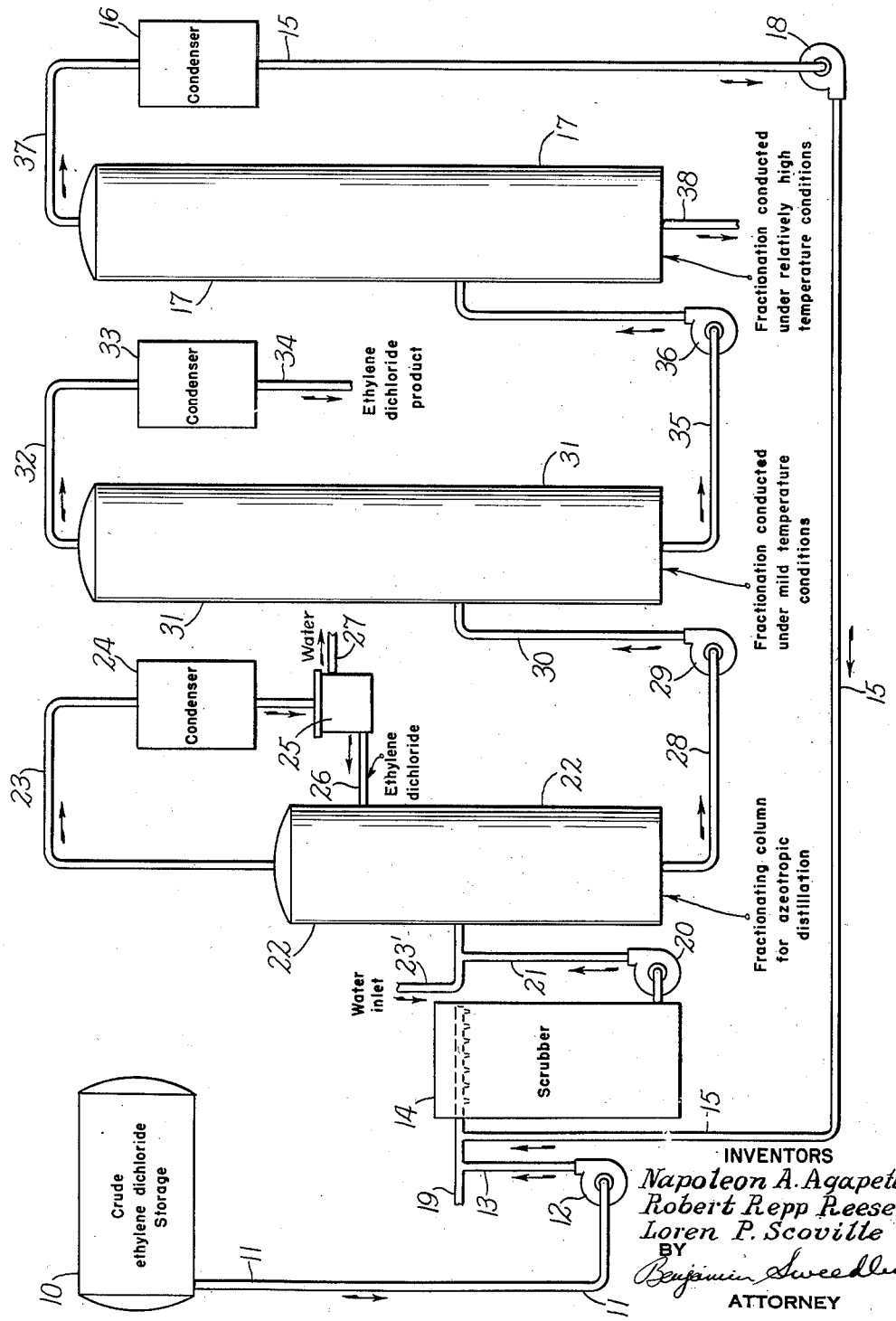
INVENTORS
Napoleon A. Agapetus
Robert Repp Reese
Loren P. Scoville
BY
Benjamin Sweedler
ATTORNEY Patented Mar. 18, 1952

2,589,212

UNITED STATES PATENT OFFICE 2,589,212

PURIFICATION OF CRUDE ETHYLENE DICHLORIDE

Napoleon A. Agapetus, Port Neches, and Robert Repp Reese, Austin, Tex., and Loren P. Scoville, Crestwood, N. Y., assignors to Jefferson Chemical Company, Inc., New York, N. Y., a corporation of Delaware Application November 8, 1949, Serial No. 126,214

10 Claims. (Cl. 202—40)

This invention relates to the purification of ethylene dichloride containing varying amounts of water, dichlorodiethylether and other high boiling chlorinated materials.

Ethylene dichloride is produced as a by-product in the production of ethylene oxide by reacting ethylene and chlorine to produce ethylene chlorohydrin which is treated with alkali to produce ethylene oxide. It is also formed by the chlorination of ethylene. As thus formed, as by-product or principal product, it invariably contains impurities, such as water and high boiling chlorinated materials, many of undetermined composition. Attempts heretofore made to purify such ethylene dichloride by treatment with alkali to neutralize the acidity followed by distillation have resulted in an unmarketable ethylene dichloride, chiefly in that as formed it has or upon standing develops an objectionable acidity. This, it is believed, is chiefly due to the formation of hydrogen chloride by decomposition of the high boilers, which hydrogen chloride contaminates the ethylene dichloride or to the formation of unstable chlorinated compounds which come over with the ethylene dichloride and upon standing form hydrogen chloride, thus imparting an objectionable acidity to the ethylene dichloride product.

It is an object of this invention to provide a process of purifying such ethylene dichloride, which process results in a marketable product, which is neutral as produced and which does not develop objectionable acidity upon standing.

Other objects and advantages of this invention will be apparent from the following detailed description thereof.

In accordance with this invention, the crude ethylene dichloride is purified by distillation involving three distillation steps. In one step the crude after treatment, to remove acidic constituents, is distilled to drive off the water. In another step the thus dried material is distilled under relatively mild temperature conditions to drive off as product a substantial proportion of the ethylene dichloride leaving as residue a mixture of ethylene dichloride and higher boiling chlorinated materials. In the other step this residue, with or without added crude, is distilled under relatively elevated temperature conditions to drive off as vapor acidic ethylene dichloride leaving a residue containing residual ethylene dichloride and the higher boiling chlorinated materials. The acidic ethylene dichloride may be treated to remove acidic constituents and produce a stable ethylene dichloride product, or it may be mixed with the crude and the resultant mixture subjected to treatment as hereinabove described.

It will be understood each of the distillation steps may be carried out continuously or batchwise and that the order of the steps is not critical. Thus, for example, the crude may first be treated to remove acidic constituents and distilled to drive off the water, the dried material subjected to distillation under mild temperature conditions to drive off the ethylene dichloride and the residue from this latter distillation step subjected to distillation under relatively elevated temperature conditions. Alternatively, the crude may be mixed with the residue from the mild distillation treatment, the mixture subjected to distillation under relatively elevated temperature conditions to separate wet ethylene dichloride from the higher boiling chlorinated materials, the wet ethylene dichloride after treatment to remove acidic constituents distilled to drive off water and the dried material subjected to distillation under mild temperature conditions to produce the product ethylene dichloride.

Surprisingly it has been found that the purification treatments hereinabove described result in the recovery of ethylene dichloride neutral as produced, which remains neutral on standing and which conforms with existing commercial specifications.

In accordance with a preferred embodiment of this invention the crude ethylene dichloride containing varying amounts of water, dichlorodiethylether and other high boiling chlorinated materials, preferably is mixed with the acidic ethylene dichloride distillate from the distillation treatment under the relatively elevated temperature conditions and the mixture subjected to a thorough water wash or preferably scrubbing with an alkali solution to remove acidic constituents. The neutralized crude ethylene dichloride mixture is then distilled to drive off the water as a water-ethylene dichloride azeotrope. The vapors taken off overhead are condensed, the condensate stratified, the ethylene dichloride returned to the distillation column as reflux liquid and the water withdrawn. This distillation is carried out to produce a substantially water free bottoms product.

Desirably, this distillation to effect removal of water is carried out in a continuous fractionating column and a small stream of water is continuously added to insure the presence of sufficient water to form water ethylene dichloride azeotrope in the upper portion of the column. The addition of .1% to 1% of water based on the weight of the feed to the column during this distillation will be found adequate. The added water makes for smoother operation of the column and assists in the removal of hydrogen chloride which leaves the system dissolved in the aqueous phase separated from the ethylene dichloride phase which is returned to the column.

The residue from the aforesaid distillation substantially free of water is distilled under relatively mild conditions of temperature to drive off ethylene dichloride vapors which are condensed leaving a residue containing from 30% to 70%, preferably about 50%, of ethylene dichloride. In this distillation step from 60% to 80% of the feed to the column is taken off overhead; the residue therefore consists of from 20% to 40% of the feed. The condensate from this distillation is a high-purity neutral ethylene dichloride which retains its neutrality on standing.

The residue from the mild distillation treatment with or without the addition thereto of some of the crude is distilled under relatively elevated temperature conditions to drive off most of the ethylene dichloride leaving a residue containing from about 3% to 20%, preferably about 10%, by weight of ethylene dichloride, the rest being higher boiling chlorinated materials. From about 20% to 65% of the feed to the column may be taken off overhead as acidic ethylene dichloride; from 35% to 80% of the feed is left as residue which is useful as a solvent for metal cleaning and degreasing and as a flotation agent. The ethylene dichloride vapors taken off overhead are condensed and the acidic ethylene dichloride condensate thus produced either added to the crude, as hereinabove described, or subjected to a water wash and drying treatment to produce a high-purity neutral ethylene dichloride which retains its neutrality on standing.

Desirably, a small stream of water is continuously added to the column during the distillation under relatively elevated temperature conditions resulting in the production of a residue containing from 3% to 20%, preferably about 10%, ethylene dichloride. The added water makes for smoother operation of the column and assists in the removal of hydrogen chloride. As in the azeotropic distillation step from .1% to 1% of water based on the weight of the feed may be added to the column for this purpose.

While, as above indicated, the crude admixed with the distillate from the relatively mild distillation treatment and the acidic ethylene dichloride from the relatively high temperature distillation treatment may be subjected to a thorough water wash to effect removal of acidic constituents it is preferred to scrub with alkali to effect this treatment. An aqueous solution or slurry of a hydroxide, carbonate or bicarbonate of an alkali or alkaline earth metal may be used for this purpose. In general a small excess of alkali should be used over and above the amount required to give a completely neutralized mixture. From an economy standpoint a solution of sodium hydroxide or carbonate is preferred.

The distillation treatments may be carried out continuously in three or more columns, the alkali scrubbed crude mixture being introduced, for example, continuously into the first column to which water is added continuously, the mixture subjected to azeotropic distillation with continuous return of the ethylene dichloride phase to the top of the column, and the dry crude ethylene dichloride withdrawn continuously from the bottom of the column and introduced into a second column in which it is subjected to distillation under relatively mild temperature conditions. From the top of this second column the vapors are condensed producing a continuously flowing stream of ethylene dichloride product. Residue from this second column is withdrawn continuously and introduced into a third column where it is subjected to a relatively high temperature treatment. Acidic ethylene dichloride is taken off overhead from this third column and the residue containing from about 3% to about 20% ethylene dichloride and higher boiling chlorinated materials is withdrawn continuously from the base of this column.

Alternatively, the process may be operated batchwise using one or more distillation columns. Thus, a batch of the neutralized mixture containing the crude is subjected to distillation in a column to drive off the water, the ethylene dichloride phase separated from the water phase and returned to the top of the column. The residue from this distillation is subjected to distillation in the same or a different column under mild temperature conditions to produce the desired ethylene dichloride product leaving a residue which is subjected to distillation under relatively elevated temperature conditions in the same or a different column. Acidic ethylene dichloride is thus taken off overhead leaving a residue containing the higher boiling chlorinated materials.

The distillation is preferably carried out under atmospheric pressure conditions, although sub- or super-atmospheric pressure conditions may be used, if desired. Operating under atmospheric pressure conditions the still pot or bottom of the column is maintained at a temperature of from 275° to 350° F. during the distillation carried out under relatively elevated temperatures, from 200°–260° F. during the azeotropic distillation to effect removal of water and from 210° to 260° F. during the mild distillation treatment. Operating under vacuum conditions these temperatures may be lower depending upon the degree of vacuum.

This invention will be illustrated by an example of its application to the treatment of ethylene dichloride produced as a by-product in the chlorohydrination of ethylene.

Ethylene chlorohydrin has for a long time been manufactured on a large scale for use as an intermediate in the manufacture of ethylene oxide and ethylene glycol. A common method of making ethylene chlorohydrin is by allowing ethylene to react with an aqueous solution of hypochlorous acid. Since hypochlorous acid is formed by interaction of chlorine and water, it has long been the practice to manufacture ethylene chlorohydrin simply by passing ethylene and chlorine simultaneously into water. By continually withdrawing the solution as formed, and replacing with additional water, it has been practical to operate a continuous process for the manufacture of ethylene chlorohydrin.

When ethylene chlorohydrin is manufactured by this reaction, a certain amount of water insoluble by-product material is invariably formed. While the relative amount of water insoluble by-product depends to some extent on reaction conditions such as temperature, concentration of chlorohydrin solution being produced, etc., it is not practical to operate such a commercial process of ethylene chlorohydrin manufacture without production of substantial amounts of this by-product material. Ordinarily, somewhere between 5% and 20% of the chlorine charged to the chlorohydrinator takes part in the reactions leading to the formation of these water insoluble by-product materials. The chief component of the water insoluble by-product materials referred to above is ordinarily ethylene dichloride but, in addition, there are ordinarily substantial amounts 2,2'-dichlorodiethyl ether, higher chlorinated ethane compounds, etc. This mixture of water-insoluble chlorinated by-products is referred to hereinafter as "crude dichloride."

The unreacted gases passing out of a chlorohydration reactor will in general be nearly saturated with dichloride vapors; this dichloride may be recovered by scrubbing these off-gases with a relatively non-volatile solvent such as gas oil, and then distilling the absorbed dichloride from the scrubber liquid.

A certain proportion of the crude dichloride will separate and form a distinct phase which may be removed from the aqueous chlorohydrin solution by use of a decanter. However, a portion will also remain dissolved in the ethylene chlorohydrin solution, and it is also generally found that it is impracticable to separate by gravity all of the dichloride phase so that a substantial portion of these by-products remains in the ethylene chlorohydrin solution as formed. One method of separating the crude dichloride from the aqueous chlorohydrin is to subject the solution to a preliminary steam distillation as disclosed in the Heard Patent 2,103,849, according to which one can effect a removal of the crude dichlorides by vaporizing about 5% of the water of the charge, and then subsequently removing the bulk of the chlorohydrin by continuing the steam distillation. However, it is frequently not desired to concentrate the chlorohydrin solution before use, and the dilute solution of aqueous ethylene chlorohydrin obtained by passing ethylene and chlorine simultaneously through water may be used directly for the manufacture of ethylene oxide by mixing it while hot with an alkali such as a lime slurry. The ethylene chlorohydrin reacts with the lime to form calcium chloride which remains in the solution and ethylene oxide which is very volatile and can be separated from the mixture by distillation. In such a process, it is normally found that the crude ethylene oxide so distilled contains some of the "crude dichloride" referred to above. Ordinarily, a substantial portion of this dichloride will separate as a distinct liquid phase from the crude ethylene oxide condensate. However, a certain proportion of the crude dichloride present will remain dissolved in the ethylene oxide layer and will have to be separated at a later stage. It is generally found that redistillation of the crude ethylene oxide condensate will effectively remove the last traces of dichlorides. By fractional distillation of this crude ethylene oxide condensate it is possible to recover overhead a dry high-purity ethylene oxide product; from the bottom of the column water and crude dichloride are withdrawn and passed to a decanter from which the last of the crude dichloride can be recovered. While the relative compositions of the dichloride product separated by the several means enumerated above will differ one from another, they are generally so similar that it is preferable to mix the several streams to produce the crude ethylene dichloride subjected to purification.

In the drawing, which is a flow sheet indicating the steps involved in the practice of a preferred embodiment of this invention, 10 represents a collecting tank in which crude dichloride drawn from any or all of the sources above mentioned are mingled. The crude dichloride is withdrawn through line 11 and is pumped by a pump 12 through a line 13 into a scrubber 14. A line 15 leads from a condenser 16 communicating with a fractionating volumn 17 through which line 15 condensate from condenser 16 is pumped by a pump 18 into the scrubber 14. The mixture of crude ethylene dichloride and the condensate from condenser 16 is scrubbed with water or alkali in scrubber 14 to remove acidic constituents; the water or alkali may be supplied to the scrubber through line 19. From the scrubber 14 the treated mixture is pumped by pump 20 through line 21 into a distillation column 22 where it is subjected to distillation.

Water is continuously added during the distillation taking place in column 22 through a line 23' to maintain vapors of water-ethylene dichloride azeotrope in the top of the column 22. The vapors passing off overhead through line 23 enter condenser 24 where they are condensed. The condensate passes into a decanter 25 which is provided with a line 26 for return of the ethylene dichloride lower layer. The upper layer of water is continuously withdrawn from decanter 25 through a line 27.

The substantially water-free bottoms product from column 22 flows through a line 28 communicating with a pump 29 for pumping the product through a line 30 into a column 31 where it is subjected to distillation. The ethylene dichloride vapors are taken off overhead through line 32 which communicates with a condenser 33. Ethylene dichloride product is withdrawn through line 34 leading from condenser 33. From the bottom of column 31 line 35 having pump 36 therein leads to column 17. This column is provided with an overhead line 37 communicating with condenser 16 and a bottoms draw-off line 38.

Each of the columns 17, 22 and 31, desirably, is of the conventional bubble cap and plate type and is provided with steam or other heating means at its base. The columns are preferably operated under atmospheric pressure conditions, although, as indicated above, sub or super atmospheric pressure conditions may be employed.

The following example is given for purposes of illustration only, it will be understood this invention is not limited to this example.

Crude ethylene dichloride from tank 10 containing water, dichlorodiethylether and other high boiling chlorinated materials is mixed with the condensate from condenser 16; the crude contains about 15% by weight of high boiling chlorinated materials. This mixture is scrubbed with dilute sodium hydroxide, employing 0.01–0.02 gallon of sodium hydroxide solution of 10% concentration per gallon of mixture. The thus neutralized mixture is then distilled under atmospheric pressure in column 22 while adding .33% water based on the weight of the feed to this column. The overhead vapors are condensed, the ethylene dichloride returned to the column and water removed. The bottoms temperature during this distillation is 230°–235° F. and the overhead temperature 185° F. The residue withdrawn from the bottom of the column is free of water. This residue is subjected to distillation in column 31, the bottoms temperature is 250° F. and the overhead temperature 182°–182.5° F. The overhead vapor is condensed and constitutes the desired purified ethylene dichloride product, which is of high purity, completely neutral and which remains neutral upon standing. The residue containing about 50% ethylene dichloride is pumped through line 35 into column 17. The bottoms temperature in column 17 is 335°–340° F. and the overhead temperature 180° F. From the bottom is removed through line 38 a residue containing 10% ethylene dichloride. The overhead vapors are condensed in condenser 16 and the condensate pumped through line 15 into scrubber 14 where it is mixed with the incoming crude.

In the above example about 70% by weight of the feed comes off as product through line 34, about 16% is recovered as by-product and removed from the process through line 38 and about 13% is recirculated through line 15.

In lieu of the preferred procedure hereinabove described, the crude ethylene dichloride is mixed with the residue from the distillation treatment under mild temperature conditions. This mixture is subjected to distillation under relatively elevated temperature conditions to drive off overhead wet acidic ethylene dichloride free of higher boiling chlorinated materials. The residue thus produced contains from 3% to 20%, preferably about 10%, ethylene dichloride the rest being the higher boiling chlorinated materials.

The wet acidic ethylene dichloride with added crude is then washed with a solution of caustic soda to neutralize acidic constituents and the neutralized material subjected to azeotropic distillation, preferably with addition of water to the column. Overhead from this column is stratified into a water layer which may be discarded, and an ethylene dichloride layer which is returned to the column as reflux, as hereinabove described. The bottoms product withdrawn from this distillation is dry, acid-free ethylene dichloride containing, however, a small amount of higher boiling materials.

The dry, acid-free dichloride is subjected to fractional distillation under mild temperature conditions. Product ethylene dichloride is taken off overhead, as hereinabove described. The residue from this distillation containing from 30% to 70%, preferably about 50%, ethylene dichloride may be mixed with the crude and the mixture subjected to distillation under relatively elevated temperature conditions.

It will be noted this invention provides an improved process of producing ethylene dichloride meeting commercial specifications and which does not lose its neutrality upon standing and this with little loss in yield. The actual loss of dichloride in the process diagrammatically illustrated in the drawing is equal to the amount of dichloride present in the residue from column 17, which residue may contain as little as 3% ethylene dichloride and preferably contains about 10% so that the loss is small. Further, this residue does have utility and may be sold as such.

Since certain changes may be made in carrying out the above process without departing from the scope of the invention it is intended that all matter contained in the above description shall be interpreted as illustrative and not in a limiting sense.

What is claimed is:

1. The process of purifying crude ethylene dichloride, which comprises at least three distillation treatments, in one of which the crude is distilled at a still bottom temperature corresponding to a temperature of from 200° to 260° F. under atmospheric pressure to separate the water therefrom, in another of which the substantially water-free crude is subjected to distillation at a still bottom temperature corresponding to a temperature of from 210° to 260° F. under atmospheric pressure to drive off overhead purified ethylene dichloride product containing from 30% to 70% of the ethylene dichloride in the water-free crude subjected to distillation, and in the third of which the residue from the distillation at a still bottom temperature of from 210° to 260° F. is subjected to distillation at a still bottom temperature corresponding to a temperature of from 275° to 350° F. under atmospheric pressure to effect separation of ethylene dichloride from higher boiling chlorinated materials.

2. In the process of purifying ethylene dichloride saturated with water the improvement which comprises continuously feeding a stream of crude ethylene dichloride saturated with water to a distillation column; continuously introducing a stream of water into said column, continuously taking off overhead vapors of an azeotropic mixture of ethylene dichloride and water; continuously condensing the vapors, stratifying the condensate into water and ethylene dichloride layers, removing the water and returning the ethylene dichloride to the distillation column; and continuously removing from said distillation column a bottoms ethylene dichloride product which is substantially free of water.

3. The process of purifying crude ethylene dichloride which comprises treating the crude to remove acidic constituents therefrom, distilling the thus treated crude at a still bottom temperature of from 200° to 260° F. under atmospheric pressure to effect separation of water therefrom, removing the water-free ethylene dichloride as residue from the aforesaid distillation treatment, distilling the same at a still bottom temperature of from 210° to 260° F. under atmospheric pressure to drive off from 30% to 70% of the ethylene dichloride as vapor, condensing the ethylene dichloride vapor thus driven off and subjecting the residue to distillation at a still bottom temperature of from 275° to 350° F. under atmospheric pressure to effect separation of ethylene dichloride from higher boiling chlorinated materials.

4. The process of purifying ethylene dichloride produced in the chlorohydrination of ethylene and containing water, dichlorodiethylether and other high boiling chlorinated materials, which comprises, step 1, mixing the crude ethylene dichloride with the condensate from step 5 hereinafter set forth; step 2, neutralizing acidic constituents in the resultant mixture; step 3, distilling the neutralized mixture from step 2 at a still bottom temperature of from 200° to 260° F. under atmospheric pressure to drive off as vapor an azeotrope of water and ethylene dichloride, condensing the vapor, stratifying the condensate into ethylene dichloride and water layers, returning the ethylene dichloride to the distillation column and withdrawing as residue a bottoms product substantially free of water; step 4, distilling the bottoms product from step 3 at a still bottom temperature of from 210° to 260° F. under atmospheric pressure to drive off overhead from 30% to 70% of the ethylene dichloride as neutral product and produce a residue containing residual ethylene dichloride and higher boiling chlorinated materials; and step 5, subjecting the residue from step 4 to distillation at a still bottom temperature of from 275° to 350° F. under atmospheric pressure to drive off overhead acidic ethylene dichloride vapor and leave a residue containing a minor proportion of ethylene dichloride and higher boiling chlorinated materials, condensing the acidic ethylene dichloride vapor and using the condensate in step 1 for admixture with the crude ethylene dichloride.

5. The process as defined in claim 4, in which in step 3 additional water is added to the distillation column.

6. The process of purifying ethylene dichloride produced in the chlorohydrination of ethylene and containing water, dichlorodiethylether and other high boiling chlorinated materials, which comprises, step 1, mixing the crude ethylene dichloride with the condensate from step 5 hereinafter set forth; step 2, treating the resultant mixture with alkali to neutralize acidic constituents; step 3, distilling the neutralized mixture from step 2 while maintaining a bottoms temperature of 200° to 260° F. under atmospheric pressure to drive off as vapor an azeotrope of water and ethylene dichloride, condensing the vapor, stratifying the condensate into ethylene dichloride and water layers, returning the ethylene dichloride to the distillation column and withdrawing as residue a bottoms product substantially free of water; step 4, distilling the bottoms product from step 3 while maintaining a bottoms temperature of 210° to 260° F. under atmospheric pressure to drive off overhead from 30% to 70% of the ethylene dichloride and produce a residue containing residual ethylene dichloride and higher boiling chlorinated materials; and step 5, subjecting the residue from step 4 to distillation while maintaining a bottoms temperature of 275° to 350° F. under atmospheric pressure to drive off overhead acidic ethylene dichloride vapor and leave a residue containing from 2% to 20% ethylene dichloride and higher boiling chlorinated materials, condensing the acidic ethylene dichloride vapor and using the condensate in step 1 for admixture with the crude ethylene dichloride.

7. The process as defined in claim 6, in which in step 3 from .1% to 1% of water based on the weight of the feed is added to the column.

8. The process of purifying ethylene dichloride produced in the chlorohydrination of ethylene and containing water, dichlorodiethylether and other high boiling chlorinated materials, which comprises, step 1, mixing the crude ethylene dichloride with the residue from step 5 hereinafter set forth; step 2, distilling the resultant mixture while maintaining a bottoms temperature of 275° to 350° F. under atmospheric pressure to drive off as vapor substantially all of the water, the major portion of the ethylene dichloride and produce a residue containing from 3% to 20% of ethylene dichloride and higher boiling chlorinated materials and condensing the vapors; step 3, treating the condensate from step 2 with alkali to neutralize acidic constituents; steps 4, distilling the neutralized material from step 3 while maintaining a bottoms temperature of from 200° to 260° F. under atmospheric pressure to drive off as vapor an azeotrope of water and ethylene dichloride, condensing the vapor, stratifying the condensate into ethylene dichloride and water layers, returning the ethylene dichloride to the distillation column, withdrawing the water and withdrawing from the distillation column a bottoms product substantially free of water; and step 5, subjecting the bottoms product from step 4 to distillation while maintaining a bottoms temperature of from 210° to 260° F. under atmospheric pressure to drive off overhead from 30% to 70% of the ethylene dichloride as product and produce a residue which is used in step 1.

9. The process as defined in claim 8, in which in step 4 from .1% to 1% of water based on the weight of the feed is added to the distillation column.

10. In the process of purifying ethylene dichloride saturated with water, the improvement which comprises introducing into the distillation column from .1% to 1% by weight of additional water based on the weight of the saturated ethylene dichloride introduced into the column, distilling, taking off overhead vapors of an azeotropic mixture of ethylene dichloride and water, condensing the vapors, stratifying the condensate into ethylene dichloride and water layers, returning ethylene dichloride to the distillation column, removing the water, and withdrawing from the column a bottoms product substantially free of water.

NAPOLEON A. AGAPETUS
ROBERT REPP REESE.
LOREN P. SCOVILLE.

REFERENCES CITED

The following references are of record in the file of this patent:

UNITED STATES PATENTS

| Number | Name | Date |
|---|---|---|
| 2,022,616 | Berliner | Nov. 26, 1935 |
| 2,353,563 | Hemminger | July 11, 1944 |
| 2,356,785 | Hammond | Aug. 29, 1944 |
| 2,359,860 | Kiefer et al. | Oct. 10, 1944 |